United States Patent [19]

Motegi

[11] Patent Number: 5,734,236
[45] Date of Patent: Mar. 31, 1998

[54] DRIVE DEVICE FOR A VIBRATION ACTUATOR HAVING A CONTROL CIRCUIT TO CONTROL CHARGE AND DISCHARGE OF AN ELECTROMECHANICAL CONVERSION ELEMENT

[75] Inventor: Kiyoshi Motegi, Kawasaki, Japan

[73] Assignee: Nikon Corporation, Tokyo, Japan

[21] Appl. No.: 749,676

[22] Filed: Nov. 15, 1996

[30] Foreign Application Priority Data

Nov. 15, 1995 [JP] Japan ................................. 7-296503

[51] Int. Cl.$^6$ ................................................. H02N 2/00
[52] U.S. Cl. ............................ 318/114; 318/127; 310/317
[58] Field of Search ................................ 318/114, 127, 318/128, 126, 129, 130; 310/317

[56] References Cited

U.S. PATENT DOCUMENTS

| | | | |
|---|---|---|---|
| 4,395,665 | 7/1983 | Buchas | 318/114 |
| 4,496,884 | 1/1985 | Hamer et al. | 318/114 |
| 4,811,835 | 3/1989 | Bullivant et al. | 318/114 X |

Primary Examiner—Steven L. Stephan
Assistant Examiner—Judson H. Jones

[57] ABSTRACT

A drive device for a vibration motor which provides constant efficient driving with a simple circuit and control sequence. The drive device for the vibration motor includes a charging circuit which impresses a predetermined voltage on an electromechanical energy conversion element, a discharge circuit which causes discharge of the electromechanical energy conversion element via an inductive element, a control circuit which alternately connects the charging circuit or the discharge circuit to the electromechanical energy conversion element, and a period detection circuit which detects the period of the resonant frequency of a circuit formed by the electromechanical energy conversion element and the inductive element. The control circuit causes an increase and a decrease of the interval the discharge circuit is connected, such that the interval of connection of the discharge circuit and the period detected by the period detection circuit become equal, causing the drive frequency of the vibration motor to change.

3 Claims, 15 Drawing Sheets

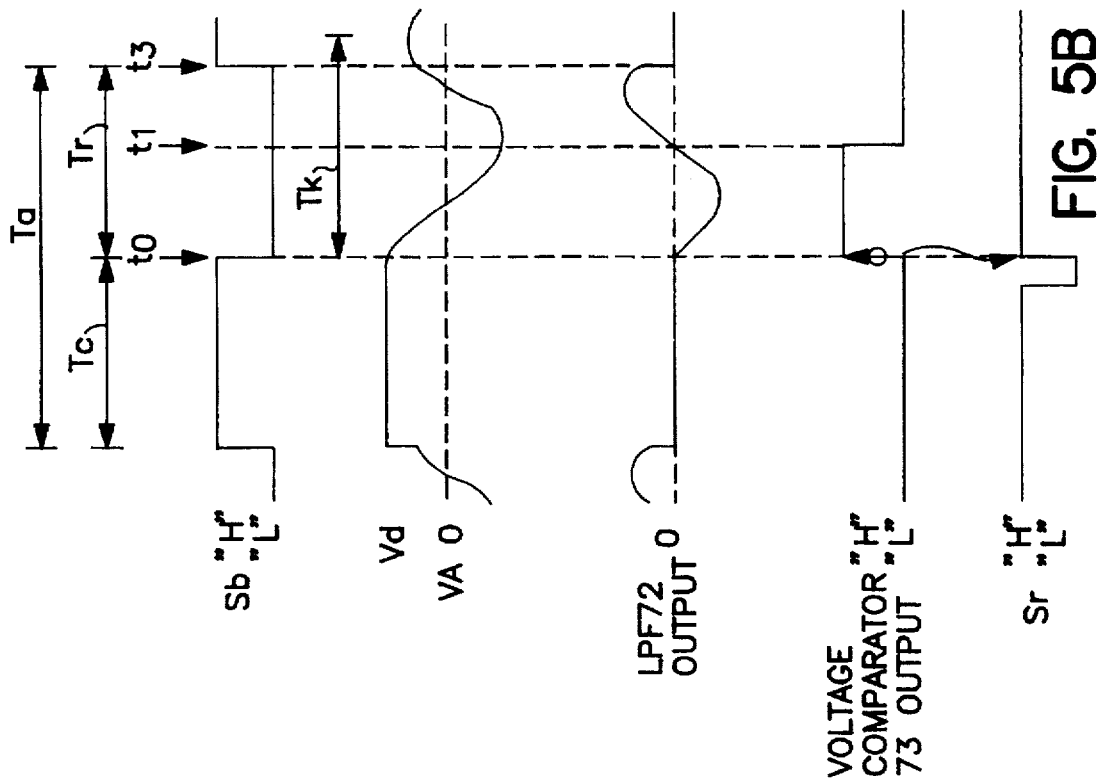
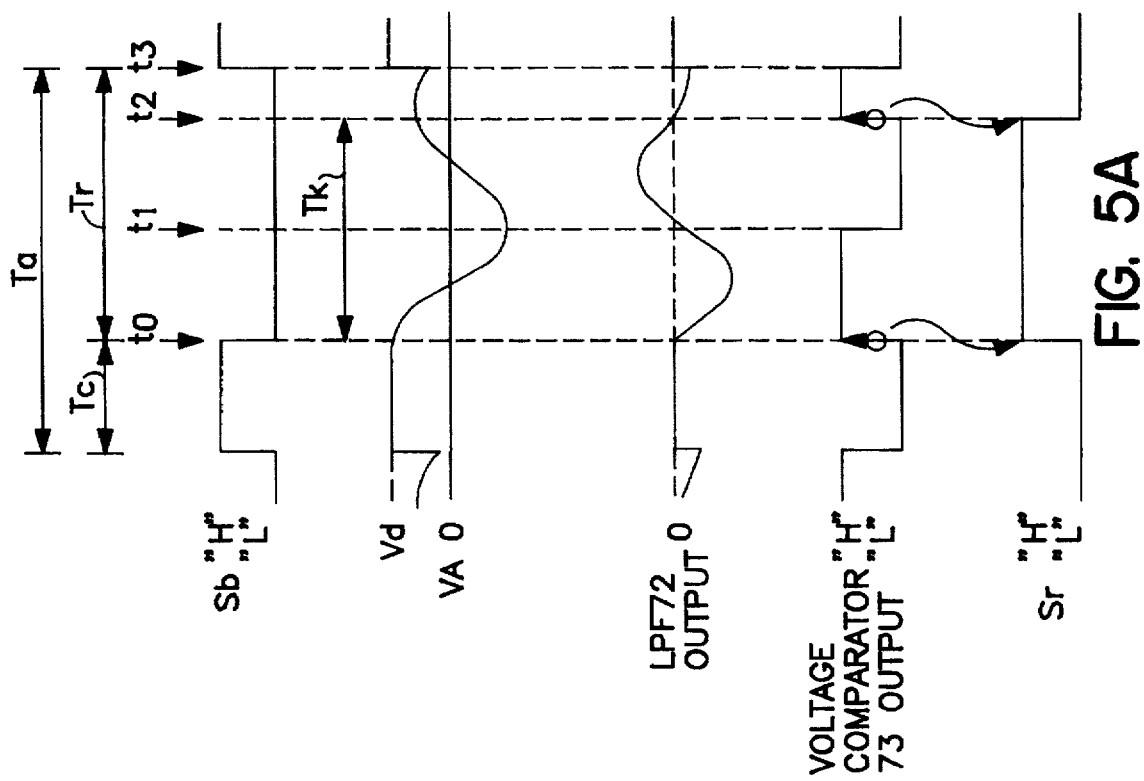
FIG. 5B
FIG. 5A

DRIVE DEVICE FOR A VIBRATION ACTUATOR HAVING A CONTROL CIRCUIT TO CONTROL CHARGE AND DISCHARGE OF AN ELECTROMECHANICAL CONVERSION ELEMENT

BACKGROUND OF THE INVENTION

1. Field of the Invention

The present invention relates to a drive device for a vibration actuator which drives a member with the mechanical vibration generated by an electromechanical energy converting element, and, more particularly, the present invention relates to a drive device for a vibration actuator having a charging and discharge circuit which are alternately connected to the electromechanical energy converting element for a period of time which provides constant efficient driving.

2. Description of the Related Art

Vibration motors are known which produce a motor drive force by inducing vibration in an elastic body with electromechanical energy converting elements in contact with the elastic body. FIGS. 14A–14C are diagrams showing a prior art vibration motor. FIG. 14A is a cross sectional diagram of a vibration motor including a moving element having a rotor 100-1 and a sliding element 100-2, and a stator having an elastic body 100-3 in contact with a vibration body 100-4 which is an electromechanical energy converting element. The moving element and the stator are driven and caused to be in compressive contact by a compression device (not shown in the drawing).

FIG. 14B is a plan view showing the arrangement of the electrodes of the vibration body 100-4. The vibration body 100-4 includes input electrodes 100-4a and 100-4b which cause the stator to vibrate when alternating voltages having a mutual phase difference of 90° or 270°, at a frequency which is decided for each vibration motor, is impressed on the electrodes 104a and 104b. The electrode 100-4c is a common ground connection electrode, and the electrode 100-4d is used to take a monitoring voltage, and does not directly contribute to the vibration of the vibration body 100-4.

FIG. 14C is a circuit diagram showing the equivalent circuit between the input electrode 100-4a or 100-4b of the vibration body 100-4 and the ground connection electrode 100-4c. As shown in the FIG. 14C, the equivalent circuit is represented by a self capacitance $C_0$ and an LCR series resonant circuit connected in parallel with self capacitance $C_0$. The drive quantity (rotational speed) of the vibration motor 100 changes according to the value of the current (motive current) which flows in the LCR series resonant circuit of the equivalent circuit. Specifically, by impressing a large alternating voltage value on the vibration body 100-4, or by making the frequency of the alternating voltage close to the resonant frequency of the LCR series resonant circuit, the motive current is increased, and it becomes possible to obtain a large drive quantity.

Two methods are known for settling the drive quantity of the vibration motor. The first method is to cause the motive current to change by changing the voltage value of the alternating voltage impressed on the vibration body 100-4, while keeping the frequency of the alternating voltage constant. The second method is to cause the motive current to change by causing the frequency to increase close to the resonant frequency of the LCR series resonant circuit, while not altering the voltage value of the alternating voltage.

A block diagram of a drive device for the prior art vibration motor 100 is shown in FIG. 15. The prior art drive device includes a drive frequency setting circuit 101, a phase shift circuit 102, a vibration body drive circuit 103 (103A, 103B), and the like. The drive frequency setting circuit 101 outputs an alternating signal, the frequency of which is set according to the drive frequency decided for the particular vibration motor, and its output is connected to the phase shift circuit 102. The phase shift circuit 102 outputs two alternating signals to the vibration body drive circuit 103 (103A, 103B), having phases which are mutually 90° or 270° different from the output of the drive frequency setting circuit 101. The vibration body drive circuit 103 (103A, 103B) outputs to the respective electrodes 100-4a, 100-4b of the vibration body 100-4, amplified alternating signals from the phase shift circuit 102. The vibration body 100-4 is excited by the alternating voltages which are input thereto, and drives the moving element.

However, the prior art drive device for vibration motors suffers from drawbacks because it is necessary to generate a sine wave alternating voltage and impress the sine wave alternating voltage on the electrodes of the vibration body, causing the drive device circuitry to become complicated, and causing large energy losses in the drive device. Furthermore, the increase in the complexity of the drive device circuitry causes the volume of the circuitry to increase. As a result of the increase in the volume of the drive device circuitry, it is difficult to find application of the drive device for the vibration motor to portable equipment because of the increased volume.

SUMMARY OF THE INVENTION

It is an object of the present invention to provide a drive device for a vibration actuator having a control circuit to control charge and discharge of an electromechanical conversion element which overcomes the problems of the prior art drive devices noted above.

Additional objects and advantages of the invention will be set forth in part in the description which follows, and, in part, will be obvious from the description, or may be learned by practice of the invention.

Objects and advantages of the present invention are achieved with a drive device for a vibration actuator which produces a drive force using the vibrating motion of an electromechanical energy converting element for converting electrical energy into mechanical energy, including a charging circuit to provide electrical energy to the electromechanical energy converting element by impressing a predetermined voltage on the electromechanical energy converting element, a discharge circuit to cause the generation of mechanical energy in the electromechanical energy converting element by causing the electromechanical energy converting element, which has been supplied with electrical energy, to discharge via an inductive element, a control circuit which alternately repeats the connection of the discharge circuit to the electromechanical energy converting element for a period which depends on the inductance characteristics of the inductive element, and the connection of the charging circuit to the electromechanical energy converting element for a period which does not depend on the inductance characteristics of the inductive element, and a period detection circuit which detects a period of resonant vibration of a circuit formed by the electromechanical energy converting element and the inductive element. The control circuit performs control so that the period for which the discharge circuit is connected to the electromechanical energy converting element becomes equal to the period detected by the period detection circuit, and causes the drive frequency of the vibration motor to change by causing the period for which the charging circuit is connected to the electromechanical energy converting element to increase and decrease.

The period detection circuit of the drive device for the vibration actuator detects the period of resonant vibration of the circuit formed by the electromechanical energy converting element and the inductive element by detecting the maximum value of the voltage change in the discharge circuit or in the electromechanical energy converting element.

Objects and advantages of the present invention are achieved in accordance with embodiments of the present invention with a drive device for a vibration actuator which produces a drive force using the vibrating motion of an electromechanical energy converting element which converts electrical energy into mechanical energy, including a charging circuit to provide electrical energy by impressing a predetermined voltage on the electromechanical energy converting element, a discharge circuit to cause the generation of mechanical energy in the electromechanical energy converting element by causing the electromechanical energy converting element, which has been supplied with electrical energy, to discharge via an inductive element, a control circuit to alternately repeat the connection of the discharge circuit to the electromechanical energy converting element for a period which depends on the inductance characteristics of the inductive element, and the connection of the charging circuit to the electromechanical energy converting element for a period which does not depend on the inductance characteristics of the inductive element. The control circuit is capable of detecting the voltage change of the electromechanical energy converting element, and, after the discharge circuit is connected to the electromechanical energy converting element, when a maximum value of the electromechanical energy converting element is detected in the voltage waveform, the charging circuit is connected to the electromechanical energy converting element.

BRIEF DESCRIPTION OF THE DRAWINGS

FIGS. 5A and 5B are graphs illustrating the operation of the vibration period detector 7 in accordance with embodiments of the present invention.

DETAILED DESCRIPTION OF THE PREFERRED EMBODIMENTS

Figure 1:
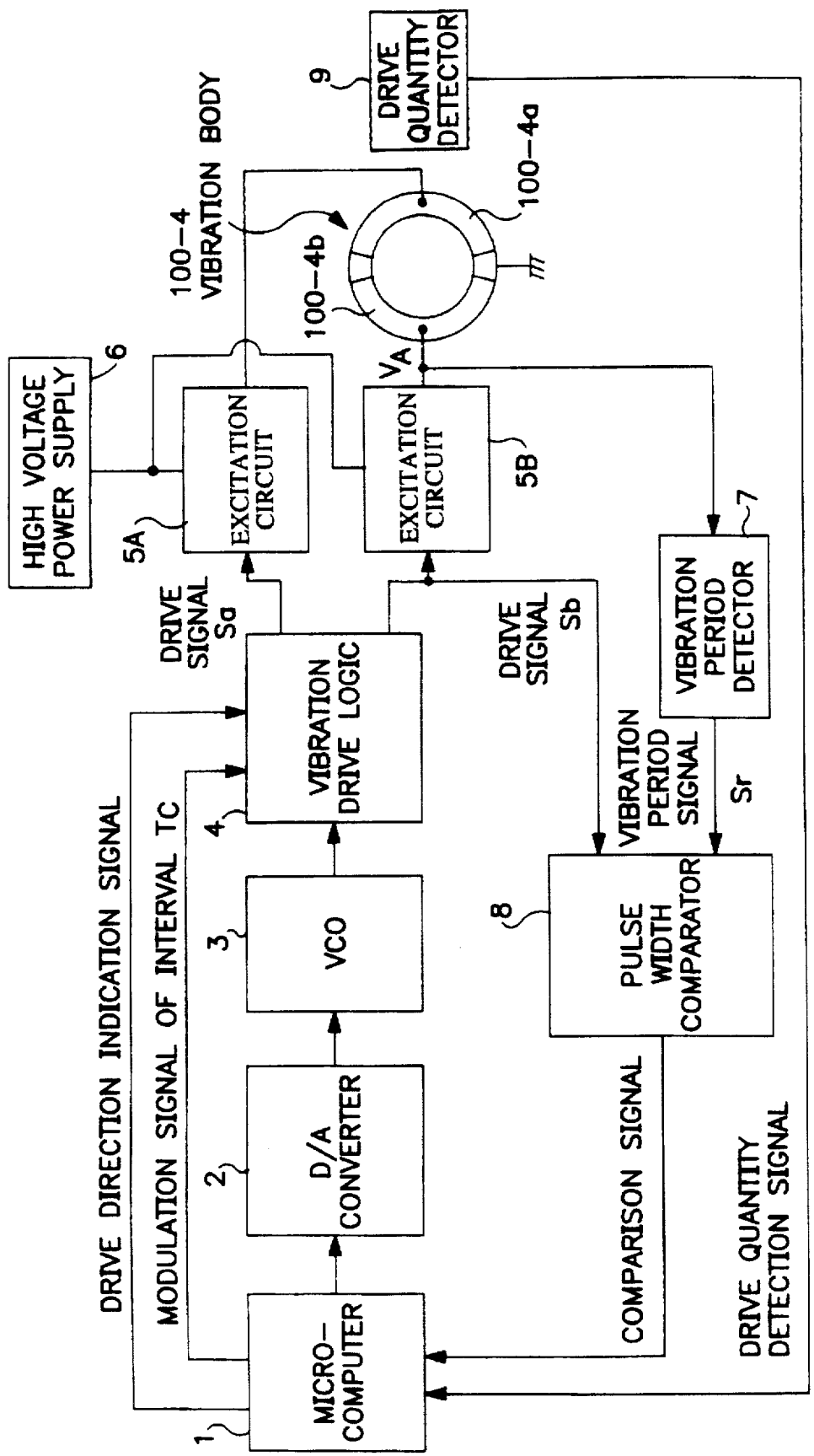
FIG. 1 is a block diagram of a drive device for a vibration actuator in accordance with embodiments of the present invention.

Reference will now be made in detail to the preferred embodiments of the present invention, examples of which are illustrated in the accompanying drawings wherein like reference numerals refer to the same or similar elements throughout.

Elements described hereinbelow which are the same as those described with reference to the prior art are referred to by like references numerals, and a detailed description of these elements is omitted. Moreover, piezoelectric bodies, electrostrictive bodies and the like, which are used as the electromechanical energy conversion elements in accordance with embodiments of the present invention, are referred to hereinbelow by the term "vibration body".

FIG. 1 is a block diagram of a drive device for a vibration actuator in accordance with embodiments of the present invention. The drive device shown in FIG. 1 includes a control circuit to control charging and discharging of a vibration body 100-4 comprising a microcomputer 1, D/A converter 2, voltage controlled oscillator (VCO) 3 and vibration body drive logic 4; an excitation circuit 5A, 5B which charges and discharges the vibration body 100-4, and a period detection circuit to detect a period of resonant vibration of a circuit comprising the electromechanical energy conversion element and an inductive element, including a vibration period detector 7, and pulse width comparator 8.

Figure 2:
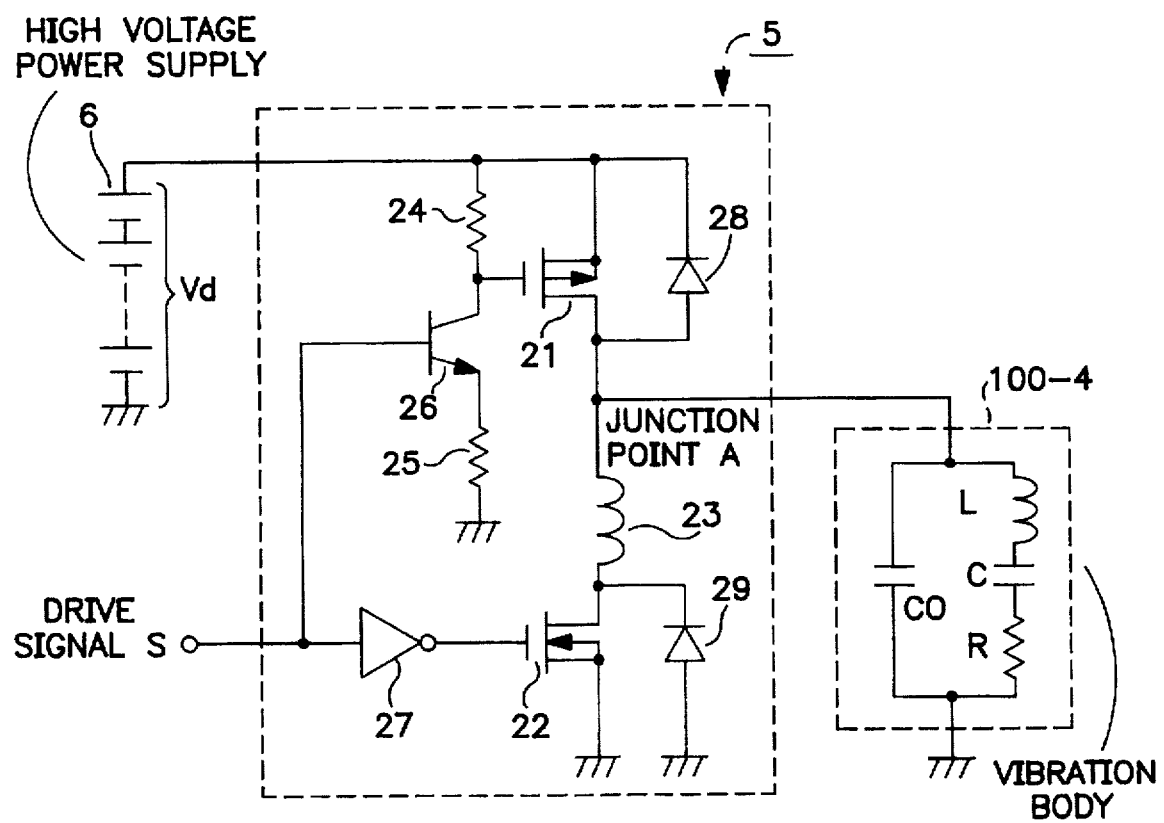
FIG. 2 is a circuit diagram of the excitation circuit 5, shown in FIG. 1, in accordance with embodiments of the present invention.

FIG. 2 is a circuit diagram of the excitation circuit 5, shown in FIG. 1, in accordance with embodiments of the present invention. The excitation circuit impresses a high voltage alternating voltage on the vibration body 100-4, whose equivalent circuit is shown in the FIG. 2, based on the drive signal S output from the vibration body drive logic 4. The excitation circuit 5 comprises switching elements 21 and 22, an inductive element 23, resistors 24 and 25, a transistor 26, a phase inverter 27, and also, as necessary, input diodes and the like rectifier elements 28 and 29.

The switching element 21 has one terminal connected to a high voltage power supply 6, and the other terminal is connected, via an inductive element 23, to the switching element 22. The terminal of the switching element 22 which is not connected to the switching element 21 is connected to ground. In accordance with embodiments of the present invention, MOS type FETs are used as the switching elements 21 and 22; however, the switching elements may be any suitable type of switches. Further, one terminal of the vibration body 100-4 is connected to the junction point A of the switching element 21 and to the inductive element 23.

The drive signal S input to the excitation circuit 5 is branched into two signals in the excitation circuit 5; one signal is input to the switching element 22 via a phase inverter 27, and the other signal is input to the transistor 26. The drive signal S branched into two signals in the excitation circuit 5 acts as both a charging control signal and a discharge control signal. The switching element 21 is closed (i.e., in the ON state) by the operation of the circuit comprising the resistors 24, 25 and the transistor 26, only when the drive signal S is at the logic level "H" (a charging control signal). Conversely, the switching element 22 is closed by the signal from the phase inverter 27 only when the drive signal S is at the logic level "L" (a discharge control signal).

When the drive signal S is at the logic level "H", a voltage $V_d$ of the high voltage supply 6 is impressed on the vibration body 100-4 via the switching element 21. As a result of the voltage $V_d$ being impressed on the vibration body 100-4, the equivalent electrical capacitance in the vibration body 100-4 is charged to the voltage $V_d$. Moreover, the time required for charging is very short because the ON resistance value of the switching element 21 is small.

When the drive signal S is at a logic level "L", one side of the inductive element 23 is grounded by the switching element 22. As a result, the capacitance of the vibration body 100-4 and the inductance of the inductive element 23 causes a resonant vibration to occur.

Figure 3A:
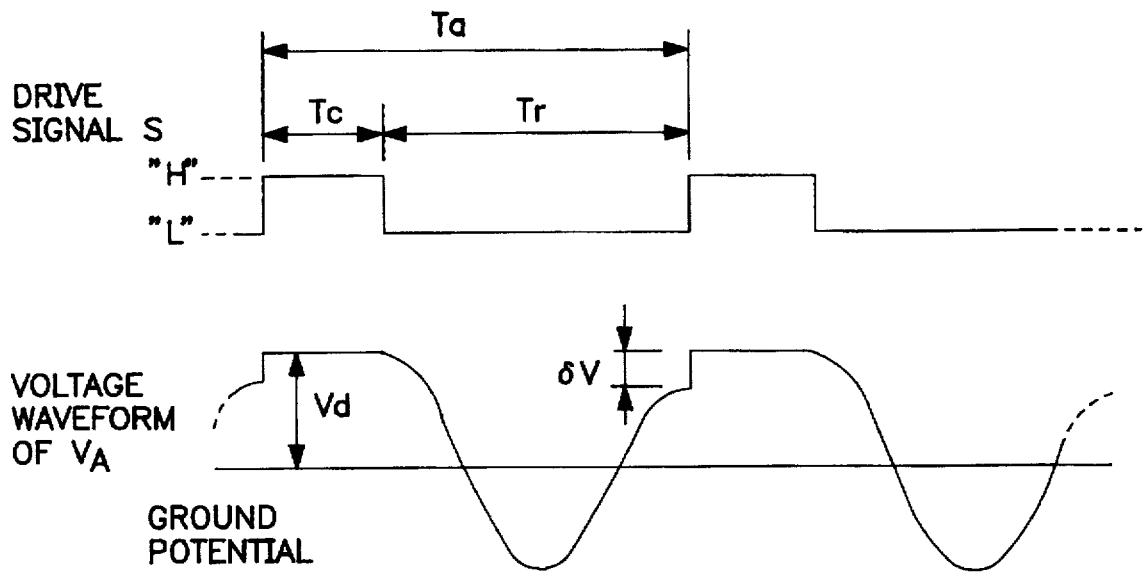
FIGS. 3A and 3B are graphs showing the relationship of a drive signal S and changes of a voltage $V_A$ in the junction point A in the excitation circuit 5 in accordance with embodiments of the present invention.
Figure 3B:
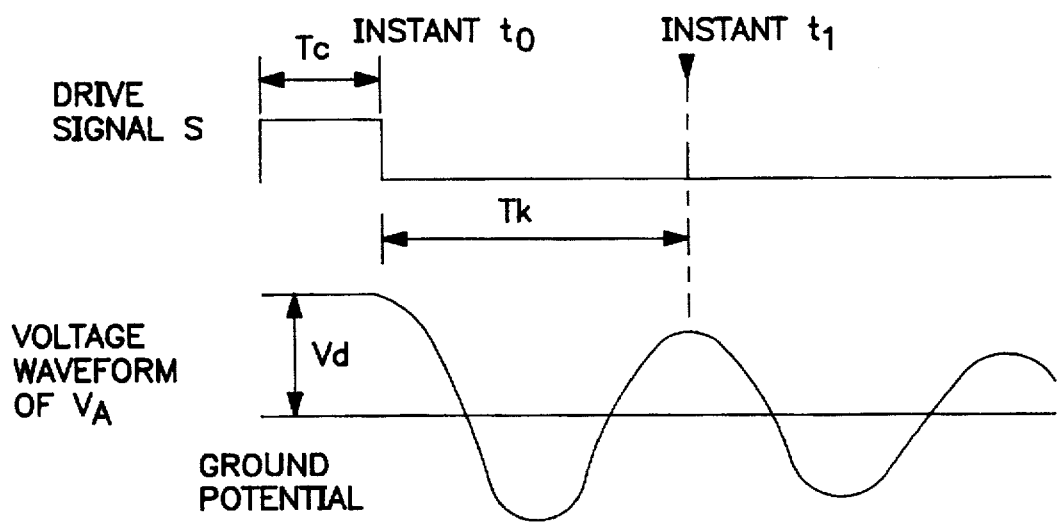

FIGS. 3A and 3B are graphs showing a relationship between the drive signal S and the changes of the voltage $V_A$ at the junction point A of the excitation circuit 5. As shown in FIG. 3A, the drive signal S repeats a period $T_c$ of logic level "H" and a period $T_r$ of logic level "L", which repeat during a period $T_a$. The drive signal S having a periodicity as described above causes alternating voltage $V_A$, shown in FIG. 3A, to be impressed on the vibration body 100-4. The relationship between the drive frequency $f_a$ of the vibration motor 100 and the period $T_a$ of the drive signal S is $T_a=1/f_a$.

The current $I_d$ supplied to the vibration body 100-4 by the high voltage source 6 becomes a minimum when the interval $T_r$ coincides with the period of the resonant vibration because the amount of charge Q which is charged into the electrical capacitance of the vibration body 100-4 is represented by the product (Q=C·V), where C is the magnitude of the capacitance and V is the charging voltage difference. Accordingly, as shown in FIG. 3A, the smaller the charging voltage difference δV, the smaller the amount of charge Q becomes.

FIG. 3B shows a relationship between the drive signal S and the changes of the voltage $V_A$ at the junction point A when the drive signal after the instant $t_0$, S is temporarily kept at the logic level "L" from an instant $t_0$ of the interval $T_c$. After the instant $t_0$, the voltage $V_A$, while repeating an attenuated vibration with vibration period $T_K$, asymptotically approaches the ground potential. The difference of the supply voltages $V_d$ and $V_A$ becomes a minimum at the instant $t_1$, after $T_K$ has elapsed from the instant $t_0$. Consequently, the charging charge quantity Q becomes a minimum if the interval $T_r$ in FIG. 3A is equal to $T_K$. Accordingly, the current $I_d$ supplied to the vibration body 100-4 from the high voltage supply 6 also becomes a minimum, and the drive of the vibration motor is performed in a most efficient state.

In accordance with the embodiment of the excitation circuit 5 shown in FIG. 2, the drive quantity of the vibration actuator 100 is settled by setting the drive frequency $f_a$ (=$1/T_a$) to a predetermined value. Therefore, it is necessary to maintain $T_a$ at a predetermined value, even in the case that $T_r$ is caused to change by changing the interval $T_c$ according to $T_c=T_a-T_r$. Because it is necessary that the interval $T_c$ must be at least longer than the time required to charge the capacity of the vibration body 100-4, $T_r$ (=$T_K$) is necessarily a value which can satisfy this condition. In accordance with the embodiment of the invention shown in FIGS. 1–3, by selecting the inductive element 23 to have an inductance of a suitable value, and by adjusting the value of $T_K$, the value of $T_r$ is set to a value realizing the above conditions.

However, the equivalent circuit (L, C, R, $C_0$) of the vibration body 100-4 changes due to temperature, compression force of the moving element and stator, drive frequency, and the like. Consequently, when fixing the length of the interval $T_r$ at a constant value, $T_r=T_K$ is not necessarily the case during the whole time that the vibration actuator is driven, and efficient driving of the vibration actuator is not obtained. Therefore, a drive quantity detector 9 (described hereinbelow with reference to FIG. 1) which detects the vibration period $T_K$ is provided, and data relating to $T_K$ from the period detection circuit is fed back to the control circuit, and the length of the interval $T_r$ is normally controlled such that $T_r=T_K$.

Referring now to FIG. 1, a microcomputer 1 controls the drive of the vibration body 100-4, and is connected to a digital-to-analog (D/A) converter 2. The D/A converter 2 converts input digital signals to analog signals, and its output is connected to a voltage controlled oscillator (VCO) 3. The VCO 3 is an oscillating circuit which changes an oscillation frequency of an output signal according to the value of an input voltage, and the output of the VCO 3 is connected to the vibration body drive logic 4. The vibration body drive logic 4 is a circuit which converts the output signal from the VCO 3 into drive signals Sa, Sb to drive the respective excitation circuits 5A, 5B. The vibration body drive logic 4 is also connected to the microcomputer 1, and a drive direction indication signal of the vibration motor and a modulation signal of the interval $T_c$ are input from the microcomputer 1.

The drive signals Sa, Sb are logic signals having a period $T_a$ which becomes $T_a=1/f_a$ when the drive frequency of the vibration body 100-4 is $f_a$, and have a mutual phase difference of 90° or 270°. Whether the mutual phase difference between drive signals Sa, Sb is 90° or 270° is determined by the drive direction (direction of rotation) of the vibration motor.

The excitation circuits 5A, 5B receive a power supply voltage $V_d$ from the high voltage power supply 6, and the outputs of excitation circuits 5A, 5B are respectively impressed on input electrodes 100-4a, 100-4b of the vibration body 100-4. The output of the excitation circuit 5B is also connected to the vibration period detector 7.

The vibration period detector 7 detects the period of resonant vibration of the circuit comprising the vibration body 100-4 and the inductive element 23. An output of the vibration period detector 7 is connected to a pulse width comparator 8. The pulse width comparator 8 also receives an input drive signal Sb from the vibration body drive logic 4. An output of the pulse width comparator 8 is connected to the microcomputer 1. Furthermore, the drive quantity detector 9, which detects the drive quantity of the vibration actuator 100, has its output connected to the microcomputer 1.

Moreover, the voltage waveform of the vibration body 100-4 may be input to the vibration period detector 7, and the drive signal Sa may be input to the pulse width comparator 8.

Figure 4:
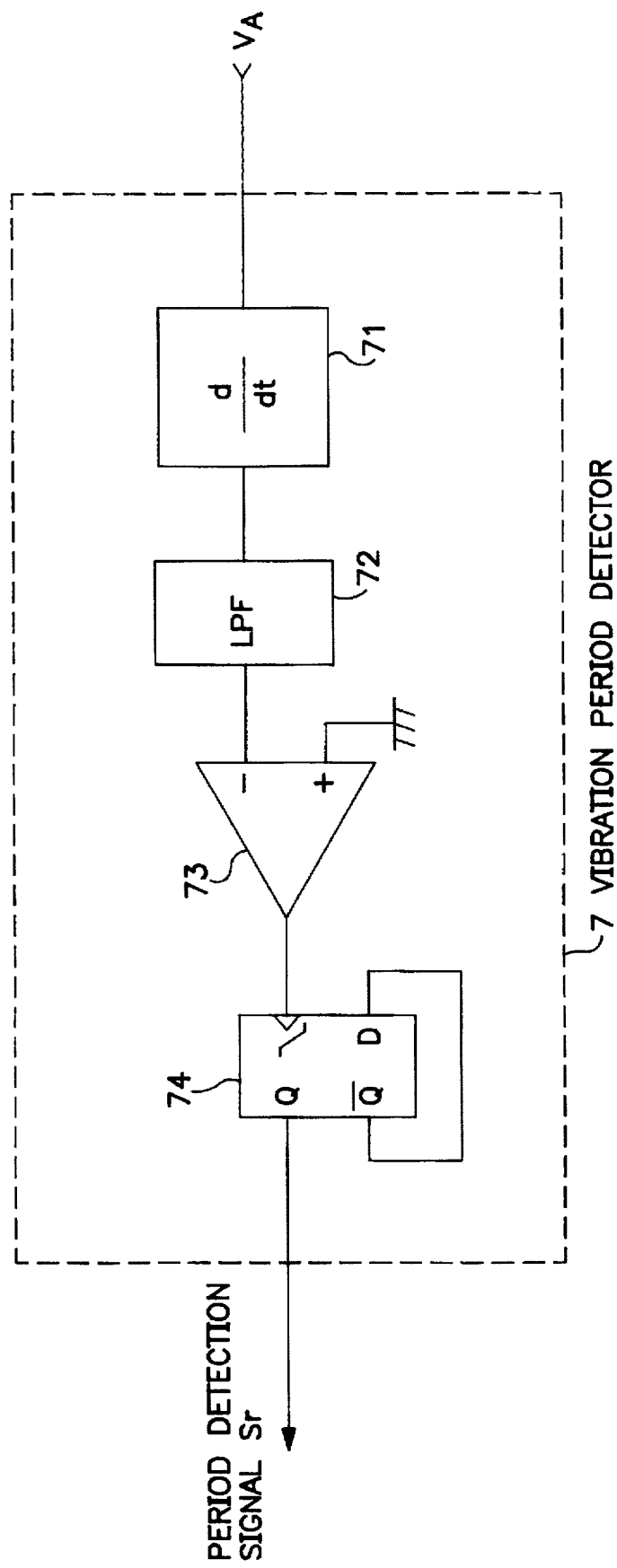
FIG. 4 is a block diagram of a vibration period detector 7, shown in FIG. 1, in accordance with embodiments of the present invention.

FIG. 4 is a block diagram of an example of the vibration period detector 7 in accordance with embodiments of the present invention. As shown in FIG. 4, the vibration period detector 7 includes a differentiator 71, a low frequency pass filter (LPF) 72, a voltage comparator 73, and a D type flip-flop (D-FF) 74. The differentiator 71 receives the voltage waveform $V_A$ and outputs a differential waveform of the input voltage waveform $V_A$. The positive input terminal of the voltage comparator 73 is grounded, causing the voltage comparator 73 to output a logic level "H" when a negative voltage is input to its negative input terminal, and to output a logic level "L" when a positive voltage is input to its negative input terminal. However, when a ground voltage is input to the negative input terminal of the voltage comparator 73, a logic level "L" is output.

FIGS. 5A and 5B are graphs illustrating the operation of the vibration period detector 7. In FIG. 5A, the waveform Sb represents the drive signal Sb. For convenience of description, the instant of transition of the drive signal Sb from the "H" level to the "L" level is denoted by $t_0$, and, after $t_c$, the change from the "L" level to the "H" level is denoted by $t_3$.

The waveform $V_A$ in FIG. 5A shows the change of the voltage $V_A$ at the junction point A of the excitation circuit 5B. As shown in FIG. 5A, the voltage $V_A = V_d$ before the instant $t_0$, specifically $V_A = V_d$ in the interval $T_c$. Moreover, in the interval $T_r$ between the instants $t_0$ and $t_3$, the damped oscillation of a sine wave is performed, the sine wave having respectively minimum and maximum values at the instants $t_1$ and $t_2$. The period of the damped oscillation is the interval $T_K$ from $t_0$ to $t_2$.

The waveform LPF 72 output shown in FIG. 5A is a voltage waveform after passing through the differentiator 71 and LPF 72. The differentiator 71 differentiates the input voltage $V_A$, and the output of the differentiator 71 is a waveform, as shown in the FIG. 5A, having a negative value in the period $t_0$–$t_1$, and a positive value in the period $t_1$–$t_2$. Furthermore, the output of the differentiator 71 generates a large positive peak voltage (not shown in the drawing) because of the sudden change in the waveform of voltage $V_A$ due to recharging the vibration body 100-4 at the instant $t_3$. However, in accordance with embodiments of the invention, the peak voltage is eliminated by the LPF 72.

The output signal of the LPF 72 is input to the negative input terminal of the voltage comparator 73. The voltage comparator 73 outputs a logic level "H" in the interval $t_0$–$t_1$ because the output signal from the LPF 72 is negative during this interval. Further, the voltage comparator 73 outputs a logic level "L" in the interval $t_1$–$t_2$ because the output signal from the LPF 72 is positive during this interval. As a result, a voltage waveform is generated at the output of voltage comparator 73, as shown in FIG. 5A.

The D-FF 74 receives the output of the voltage comparator 73. The D-FF 74 is forced to reset directly before the instant $t_0$ by a circuit (not shown in the drawing) to an output logic level "L". After being reset to output logic level "L", the D-FF 74 changes to output a logic level "H" as it inputs the rising edge (the arrow portion in the graph of voltage comparator 73 output of FIG. 5A of the output waveform of the voltage comparator 73. The output signal of the D-FF 74 is the period detection signal $S_r$, and assumes a logic level "H" for only the interval of the vibration period $T_K$, as shown in the waveform $S_r$ of FIG. 5A.

Accordingly, in the case that $T_r > T_K$, at the end of the interval $T_r$ (instant $t_3$), the logic level of the period detection signal $S_r$ becomes "L", and, as shown in FIG. 5B, in the case that $T_r < T_K$, the logic level of the period detection signal becomes "H."

The pulse width comparator 8 outputs to the microcomputer 1, as a comparison signal, the logic level of the period detection signal Sr at the end of the interval $T_r$, specifically, the rising time of the drive signal Sb. Therefore, in the case that the comparison signal is "L", interval $T_r >$ vibration period $T_K$; and, in the case that the comparison signal is "H", interval $T_r <$ vibration period $T_K$.

Figure 6:
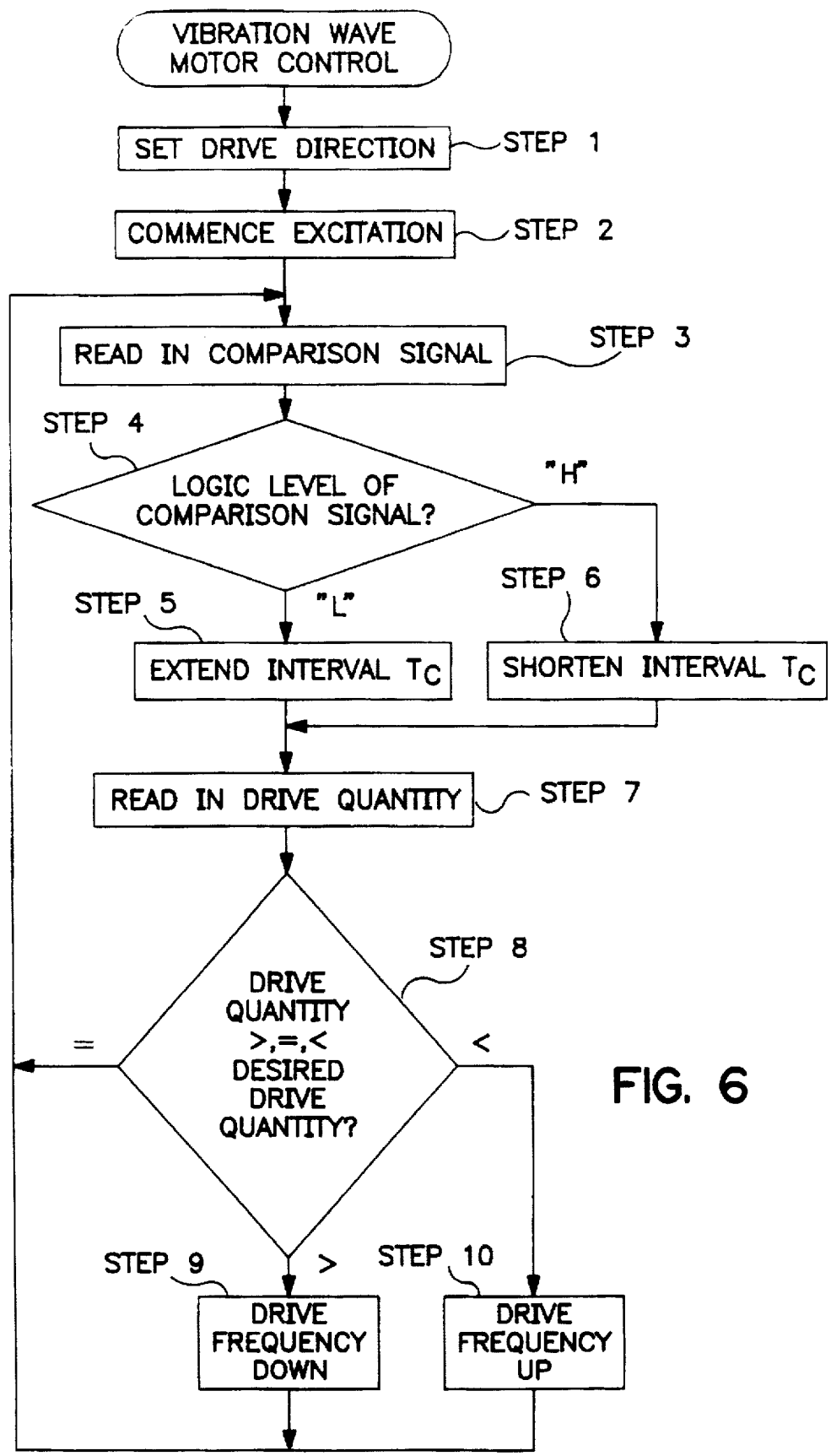
FIG. 6 is a flow chart showing an operational process for driving a vibration actuator in accordance with embodiments of the present invention.

FIG. 6 is a flow chart showing an operational process for controlling the drive device shown in FIG. 1 in accordance with embodiments of the present invention. The operational process shown in FIG. 6 is controlled by the microcomputer 1.

Control of the excitation drive of the vibration body 100-4 is started when the microcomputer 1 carries out an instruction to drive the vibration actuator. In step 1, the microcomputer 1 indicates a drive direction of the vibration motor to the vibration body drive logic 4 with a drive direction instruction signal. Next, in step 2, digital data having a drive frequency $f_a$ is output to the D/A converter 2. At this time, the D/A converter 2 outputs to the VCO 3 analog signals corresponding to the received digital data, and the VCO 3 outputs a frequency signal to the vibration body drive logic 4. In accordance with the frequency signal, the vibration body drive logic 4 generates drive signals Sa and Sb whose frequency is $f_a$, and the excitation circuits 5A, 5B commence excitation of the vibration body 100-4. The phase difference of the drive signals Sa and Sb, either 90° or 270°, depends on the drive direction indication signal.

Continuing, in step 3 the microcomputer 1 reads in the logic level of the comparison signal which is output from the pulse width comparator 8. The logic level of the comparison signal detected in step 3 is then determined (step 4). In the case that the logic level is "L" ($T_r > T_K$), the operational process proceeds to step 5; in the case that the logic level is "H" ($T_r < T_K$), the operational process proceeds to step 6.

If the logic level determination is "L" in step 4, in step 5, the vibration drive logic 4 is provided with a modulation signal instructing the vibration drive logic 4 to extend the interval $T_c$ by a predetermined amount from the present time, and the operational process proceeds to step 7. At this time, when the interval $T_c$ is extended, and the interval $T_r$ becomes shorter, the interval $T_r$ approaches the vibration period $T_K$.

If the logic level determination is "H" in step 4, in step 6, the vibration drive logic 4 is provided with a modulation signal instructing the vibration drive logic 4 to shorten the interval $T_c$ by a predetermined amount from the present time, and the operational process proceeds to step 7. At this time, the period of the drive signal Sb is $T_a$ (=1/$f_a$). Moreover, because $T_r = T_a - T_c$, as the interval $T_c$ becomes shorter and the interval $T_r$ becomes longer, approaching the vibration period $T_K$.

The modulation signal of the interval $T_c$, which is output in steps 5 and 6, modulates the length of the interval $T_c$ of the drive signal Sb, and also modulates the length of the interval $T_c$ of the drive signal Sa. It is noted that the characteristics of the vibration bodies connected to the two input electrodes 100-4a, 100-4b of the vibration body 100-4 are about the same. Therefore, detecting the voltage waveform and drive signal of one input electrode (in FIG. 1, the voltage waveform of the input electrode 100-4b and the drive signal Sb) controls without hindrance the length of the interval $T_c$ of both drive signals.

Continuing, in step 7, the microcomputer 1 reads in the drive quantity detection signal from the drive quantity detector 9. In step 8, the microcomputer 1 determines whether or not the drive quantity of the vibration actuator detected by the drive quantity detector 9 is equal to a desired drive amount. When the detected drive quantity is less than the desired drive amount, the operational process proceeds to step 9. When the detected drive quantity is higher than the desired drive amount, the operational process proceeds to step 10. When the detected drive quantity is equal to the desired drive amount, the operational process returns to step 3.

In step 9, the microcomputer 1 performs a process to decrease the drive frequency $f_a$ of the vibration body 100-4 to a frequency lower than the present drive frequency. Specifically, the microcomputer 1 performs control such that the oscillation frequency of the VCO 3 approaches the resonant frequency of the vibration body 100-4 by changing the output voltage of the D/A converter 2 by a predetermined amount.

In step 10, the microcomputer 1 increases the drive frequency of the vibration body to a frequency higher than the present drive frequency. Specifically, the microcomputer 1 performs control such that the oscillation frequency of the VCO 3 is away from the resonant frequency of the vibration body 100-4 by changing the output voltage of the D/A converter 2 by a predetermined amount.

As has been described hereinabove, the drive device in accordance with embodiments of the present invention, based on rectangular wave logic signals which the control circuit outputs, provides electrical energy by impressing a predetermined voltage on a vibration body, and performs periodic repetition causing the vibration body to discharge via an inductive element. Because the vibration body is discharged via an inductive element, regardless of the signal output from the control circuit also being a rectangular wave, the voltage waveform impressed on the vibration body becomes a sine wave vibrating motion according to the resonant frequency set from the inductance of the inductive element and the equivalent circuit constants of the vibration body. Accordingly, the conversion of electrical energy into mechanical energy occurs in the vibration body, and drives the vibration motor. Furthermore, in accordance with embodiments of the present invention, it is not necessary for the control circuit to output a sine wave to cause vibrating motion in the vibration body, and it is possible for the control circuit to be simple and compact.

Moreover, in accordance with embodiments of the present invention, because a high voltage power supply is directly connected to the vibration body when charging the vibration body, the main factor causing losses of electrical energy between the high voltage supply and the vibration body can be eliminated, and highly efficient driving of a vibration actuator becomes possible.

Furthermore, in accordance with embodiments if the present invention, the time required to charge the vibration body differs from the interval in which the charging is performed, and it is possible to set it unrelated to the resonant frequency of the inductive element and vibration body. In accordance with embodiments of the present invention, in consideration of this point, the drive frequency is changed by causing the charging time to increase and decrease, and it is thereby possible to easily settle the drive quantity of the vibration motor.

Moreover, in accordance with embodiments of the present invention, the microcomputer 1, by repeating the operations of step 3 through step 10 of the flow chart of FIG. 6, settles the drive quantity (rotation speed) of the vibration actuator, controlling the drive frequency of the vibration body, and in addition controls such as to cause agreement of the interval $T_r$ with the period $T_K$ of the resonant vibration due to the inductive element 23 in the excitation circuit 5 and the vibration body 100-4. Thus, in accordance with embodiments of the present invention, even in cases in which $T_K$ changes due to the effect of temperature, because the interval $T_r$ is adjusted such that $T_r=T_K$, the current supplied from the high voltage power supply 6 normally becomes small, and it is possible to drive the vibration motor efficiently.

A modification of the embodiment of the drive device for a vibration body shown in FIG. 1 will now be described with reference to FIG. 7, wherein like reference numerals in FIGS. 1 and 7 refer to like elements. The embodiment of the drive device shown in FIG. 7 differs from the embodiment shown in FIG. 1 in that a time difference comparator 10 is used to generate a comparison signal, instead of the vibration period detector 7 and the pulse width comparator 8.

The output of the vibration drive logic 4 are and the input electrode 100-4b of the vibration body 100-4 are connected to the time difference comparator 10, to input, respectively, a drive signal Sb and a voltage waveform $V_A$. The output of the time difference comparator 10 is connected to the microcomputer 1.

Figure 8:
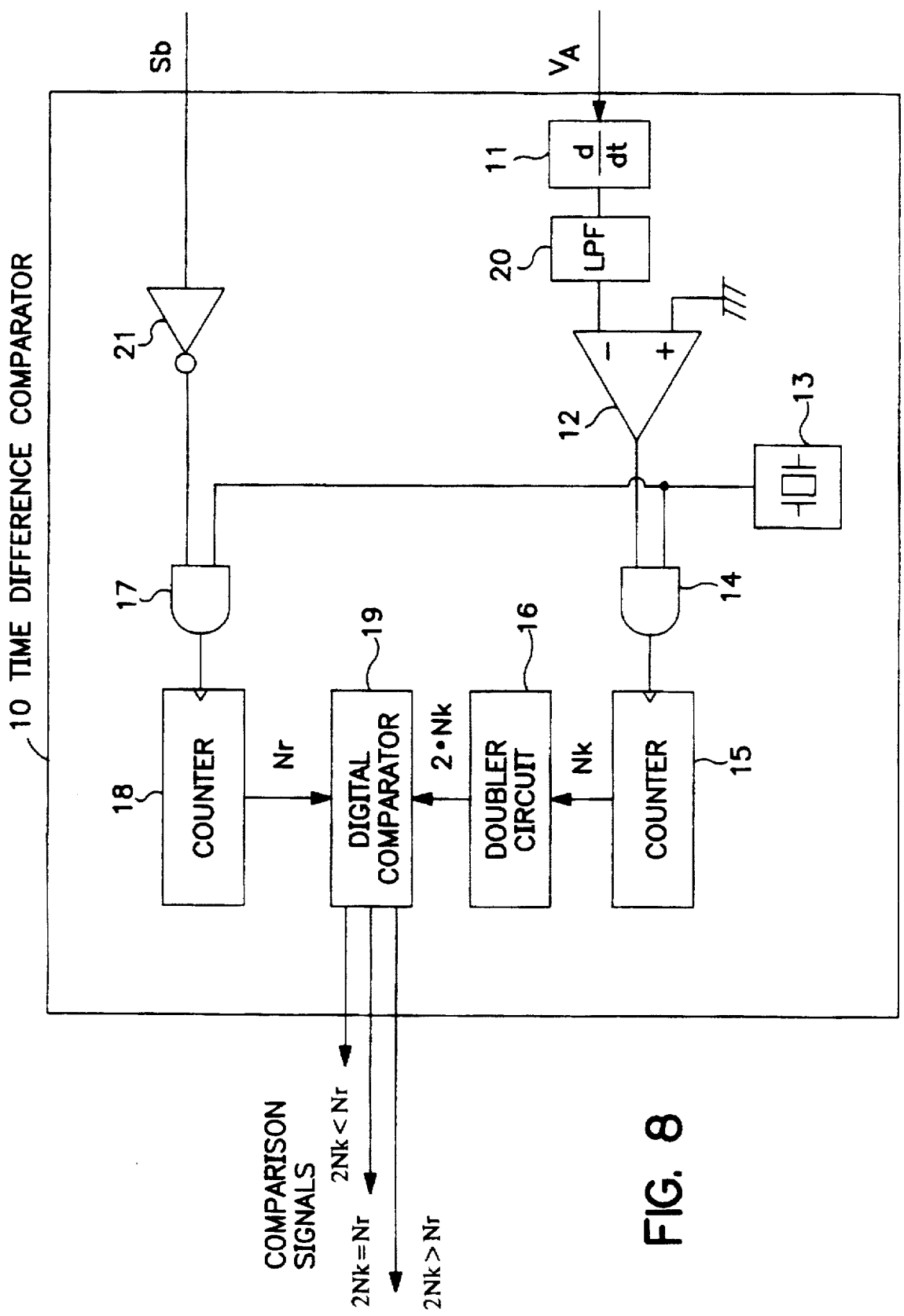
FIG. 8 is a circuit diagram showing an example of a time difference comparator 10, shown in FIG. 7, in accordance with embodiments of the present invention.

FIG. 8 is a circuit diagram showing an example of a time difference comparator 10 in accordance with embodiments of the present invention. In the time difference comparator 10, the input voltage waveform $V_A$ is first input to a differentiator 11. The differential waveform of the waveform $V_A$ output from the differentiator 11 next passes through a LPF 20 to remove the high frequency components.

Next, the output of the LPF 20 is input to a voltage comparator 12. The voltage comparator 12, having its positive input terminal grounded, outputs a logic level "H" when the differential waveform of $V_A$ input to its negative input terminal is a negative voltage, and outputs a logic level "L" when the differential waveform of $V_A$ is a positive voltage. However, when the differential waveform of $V_A$ is the ground voltage, a logic level "L" is output. The output from the voltage comparator 12 is input, together with the output of a pulse oscillator 13, to an AND (logical product) gate 14, and the output from the AND gate 14 is input to a counter 15. The counter 15 counts a number of pulses $N_K$ output from the pulse oscillator 13 only during the intervals that the output of the voltage comparator 12 is at logic level "H". The count value $N_K$ is input to a doubler circuit 16 at the same time that the input signal Sb becomes "H", and, after the doubler circuit 16 doubles the value $N_K$ to $2N_K$, the output of the doubler circuit 16 is input to a digital comparator 19.

The drive signal Sb input to the time difference comparator 10 passes through an inverter 21 (phase inverter), and is input, together with the output of the pulse oscillator 13, to an AND gate 17. The output of the AND gate 17 is input to a counter 18, such that the counter 18 counts a number of pulses $N_r$ output from the pulse oscillator 13 only during the intervals that the input signal Sb is logic level "L". The count value $N_r$ is input to the digital comparator 19 at the same time as the input signal Sb becomes "H". The digital comparator 19 determines the larger or smaller of $2N_K$ and $N_r$, and corresponding to the respective cases $2N_K>N_r$, $2N_K=N_r$, $2N_K<N_r$, outputs a comparison signal on any of three (3) signal output lines.

Moreover, the counters 15, 18 reset their count value $N_r$, $N_K$ to "0" in the latest interval (interval $T_c$) that the logic level of the drive signal Sb is logic level "H", with a circuit which is not shown in the drawing.

Figure 9:
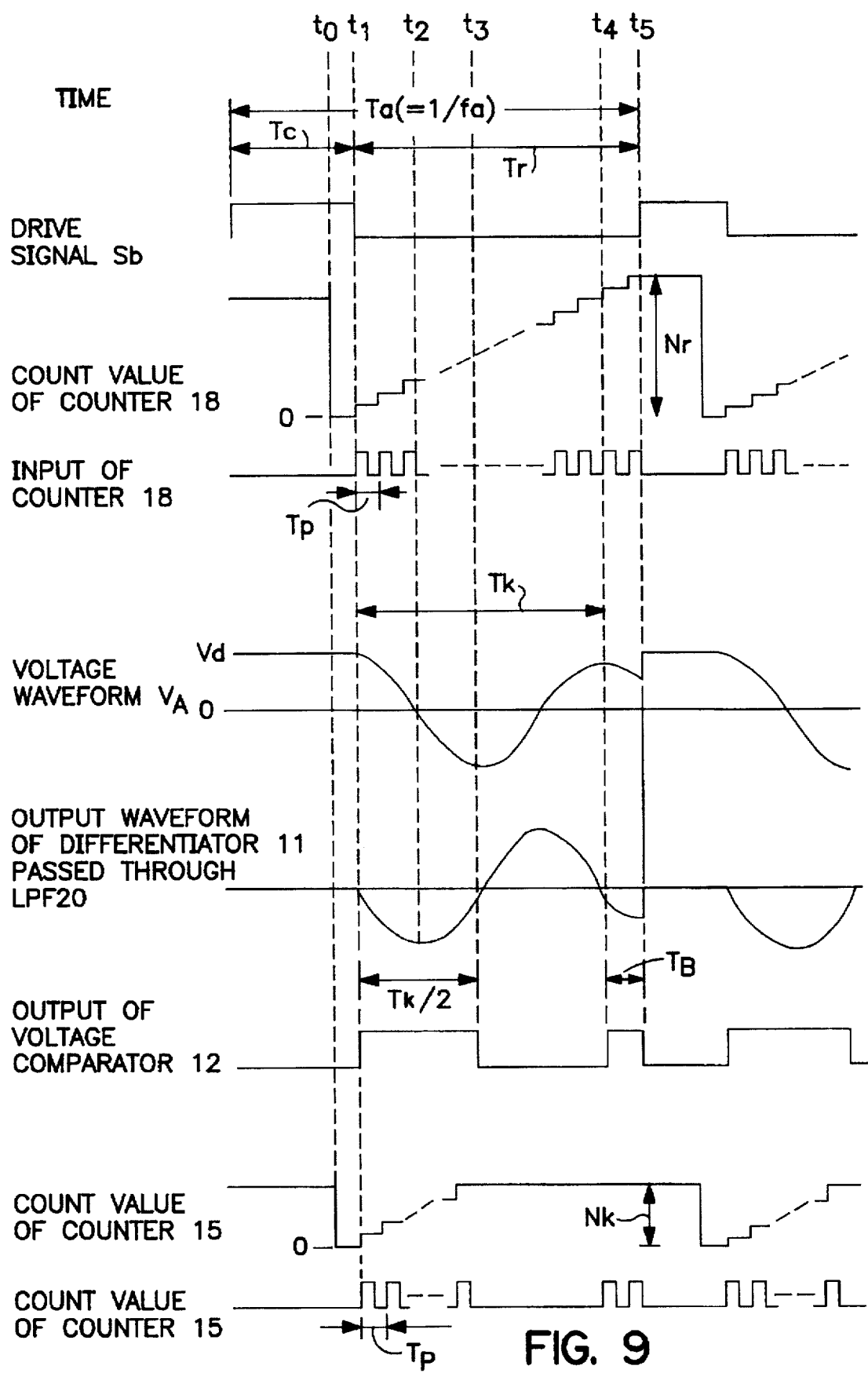
FIG. 9 is a graph showing the operation of the time difference comparator in accordance with embodiments of the present invention.

FIG. 9 illustrates graphs which describe the operation of the time difference comparator 10. The operation of the time difference comparator 10 will be described, with reference to FIG. 9, according to time in the drive period $T_a$. It is noted that in the graphs shown in FIG. 9, the instant $t_0$ is set directly before the end of the interval $T_c$, during which the drive signal is "H", the instant $t_1$ is set as the instant of commencement of the interval $T_r$ (end instant of the interval $T_c$), and $t_5$ is set as the same end instant of the interval $T_r$.

Firstly, at the instant $t_0$, the count values $N_r$, $N_K$ of the counters 15, 18 are reset to "0" by the circuit not shown in the drawing. Between instants $t_1$–$t_5$, pulses are input from the pulse oscillator 13 to the input of counter 18 by the AND circuit 17. Accordingly, at the instant $t_5$, the count value $N_r$ of the counter 18 becomes $N_r = T_r/T_P$, reflecting the time of the interval $T_r$, and setting the oscillation pulse period of the pulse oscillator 13 as $T_P$.

The voltage waveform of $V_A$, in the interval $T_r$ ($t_1$–$t_5$), has a minimum value at the instant $t_3$, and has a maximum value at the instant $t_4$ showing an attenuated vibration waveform. $V_A$ becomes equal to $V_d$ at the instant $t_5$ because the next drive period $T_c$ begins, and similar changes are subsequently repeated. From such a voltage waveform of $V_A$, the period $T_K$ of this attenuated vibration, it can be seen that $T_K = t_4 - t_1$.

The output of the voltage comparator 12 outputs a logic level "H" between $t_1$ and $t_3$, a logic level "L" between $t_3$ and $t_4$, and again a logic level "H" between $t_4$ and $t_5$. The first interval during which the output of the voltage comparator 12 is "H" ($t_1$–$t_3$) is ½ the time of the vibration period $T_K$. During the first interval, pulses from the pulse oscillator 13 are input to the counter 15 by the AND gate 14. During the second interval $T_B$ ($t_4$–$t_5$), in which the output of the voltage comparator 12 is "H", pulses are input to the counter 15, but the counter 15 does not count. Consequently, the count value $N_K$ of the counter 15 becomes $N_K = T_K/(2T_P)$. The count value $N_K$ is output twofold by the doubler circuit 16 as $2N_K$ ($= T_K/T_P$). Specifically, $2N_K$ reflects the vibration period $T_K$.

At the instant $t_5$, the digital comparator 19 determines the larger or smaller of count value $N_r$ of the counter 18 and the output $2N_K$ of the doubler circuit 16. In the case of $2N_K < N_r$, $T_K < T_r$; in the case of $2N_K = N_r$, $T_K = T_r$. Moreover, in the case of $2N_K > N_r$, $T_K > T_r$. The graph of FIG. 9 corresponds to the case of $T_K < T_r$. The digital comparator 19 outputs a logic level "H" on one signal line from among the three (3) comparison signal lines, according to the result of the determination.

Figure 7:
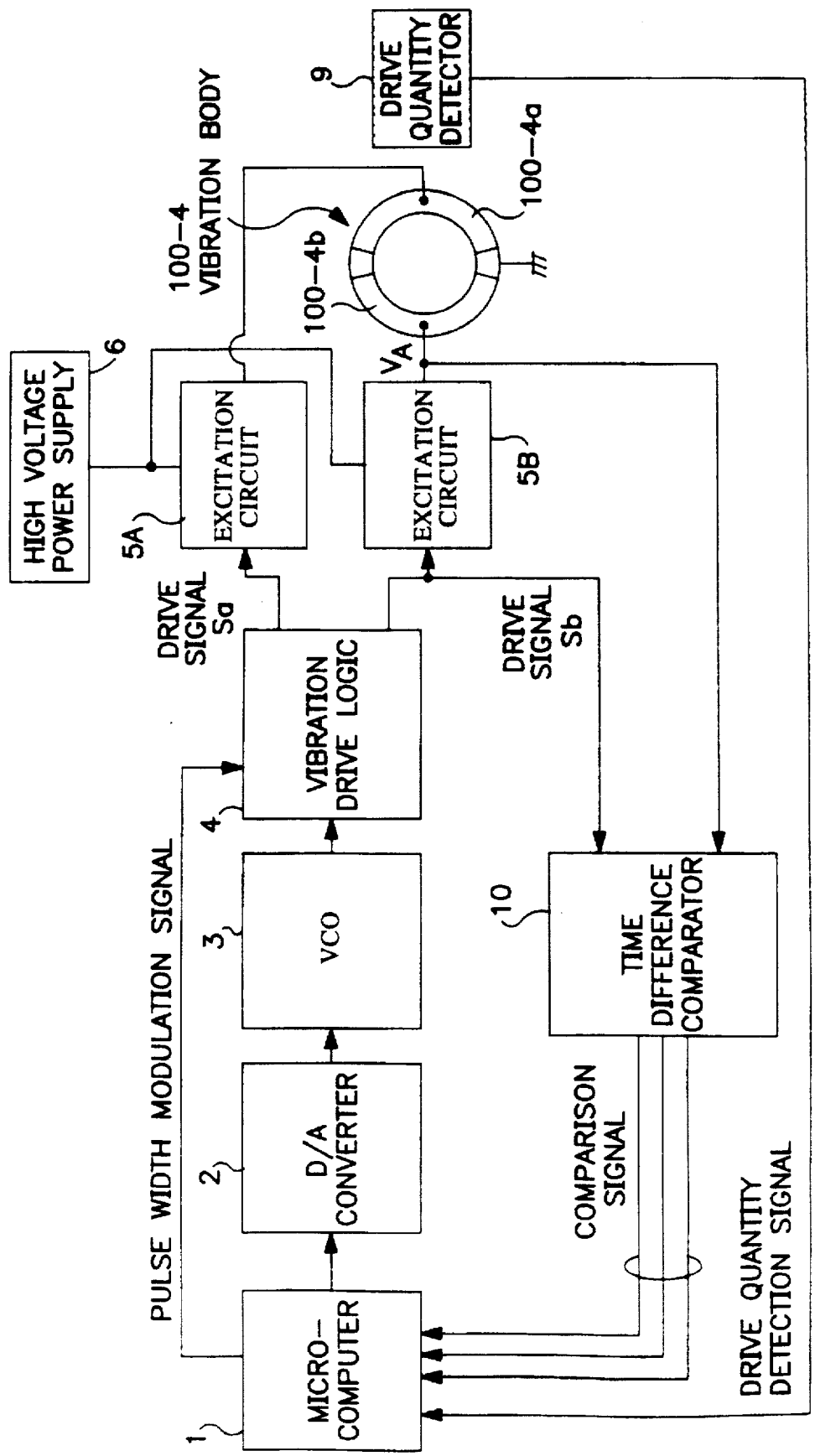
FIG. 7 is a block diagram of a drive device for a vibration actuator in accordance with embodiments of the present invention.
Figure 10:
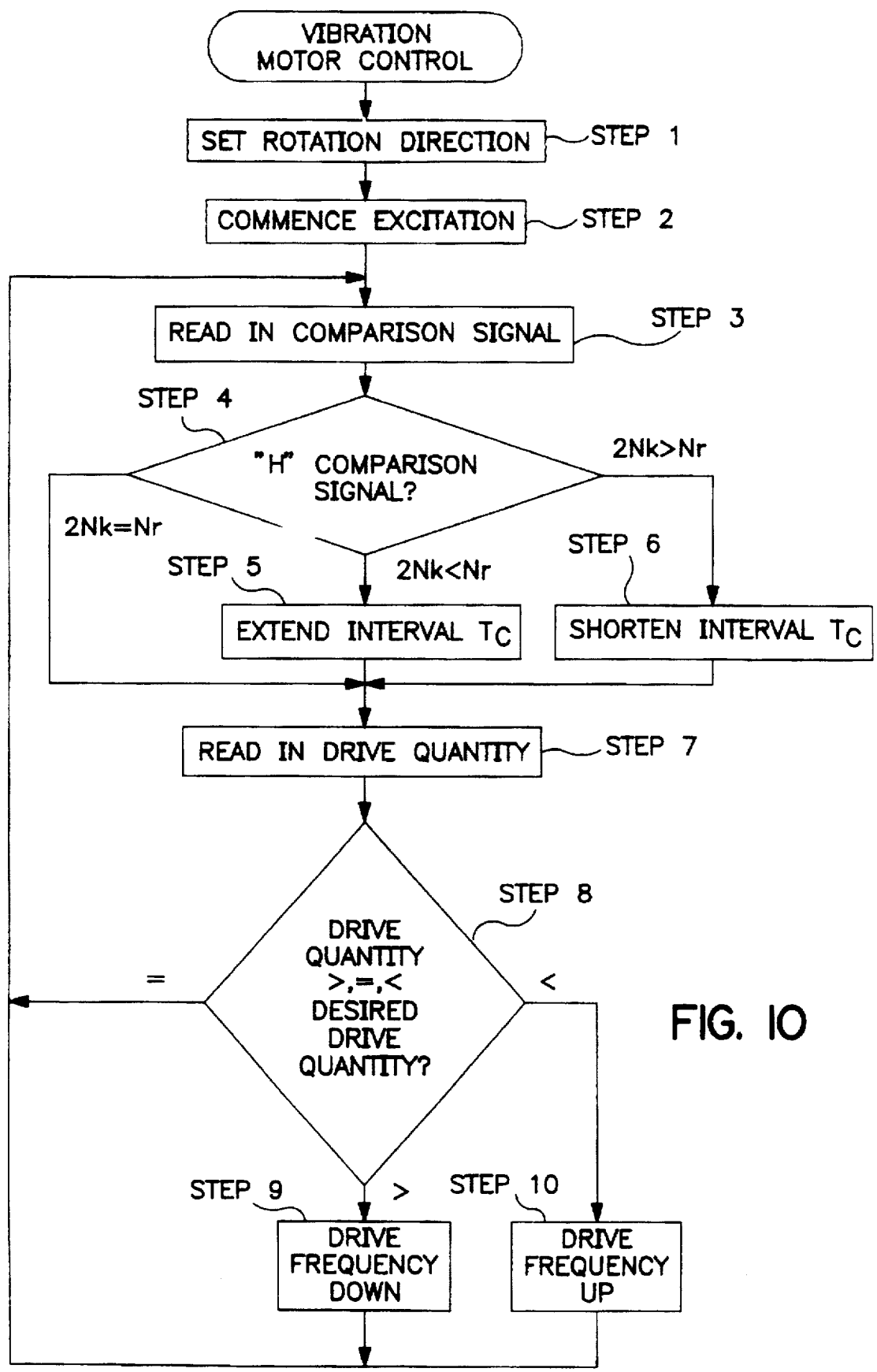
FIG. 10 is a flow chart showing an operational process for driving a vibration actuator in accordance with embodiments of the present invention.

FIG. 10 is a flow chart showing an operational process for controlling he drive device show in FIG. 7 in accordance with embodiments of the present invention. The microcomputer 1 controls the various operational process steps.

Steps 1–3 of the flow chart of FIG. 10 perform the same operational process as steps 1–3 of the flow chart of FIG. 6 and a description of these steps will not be repeated here. In step 4, based on a logic level "H" detected on any of the three comparison signal lines output from time difference comparator 10, the relationship of $N_K$ and $N_r$ is determined. In the case that $2N_K < N_r$, the operational process proceeds to step 5, and the interval $T_c$ is extended by a predetermined amount (the interval $T_r$ is shortened). In the case that $2N_K > N_r$, the operational process proceeds to step 6, and the interval $T_c$ is shortened by a predetermined amount (the interval $T_r$ is lengthened). Moreover, in the case that $2N_K = N_r$, the time of the interval $T_c$ is not altered, and the operational proceeds to step 7.

The operations in steps 7–10 are the same as, or similar to, the operations in steps 7–10 of the embodiment of the invention shown in FIG. 6, and a description of these steps is omitted here.

As described above, the embodiment of the invention shown in FIGS. 7–10 has the advantage that, if a minimum value of $T_r$ is stipulated, such that at least $T_r > T_K/2$, for example, in the case $T_r < T_K$, it is possible to find the vibration period $T_K$ by measuring the length of a half period of the vibration period $T_K$.

Another embodiment of a drive device in accordance with the present invention will now be described with reference to FIG. 11. Like elements in the embodiments of the invention shown in FIGS. 1, 7 and 11 are referred to by like reference numerals, and a detailed description of these like elements will not be repeated.

Figure 11:
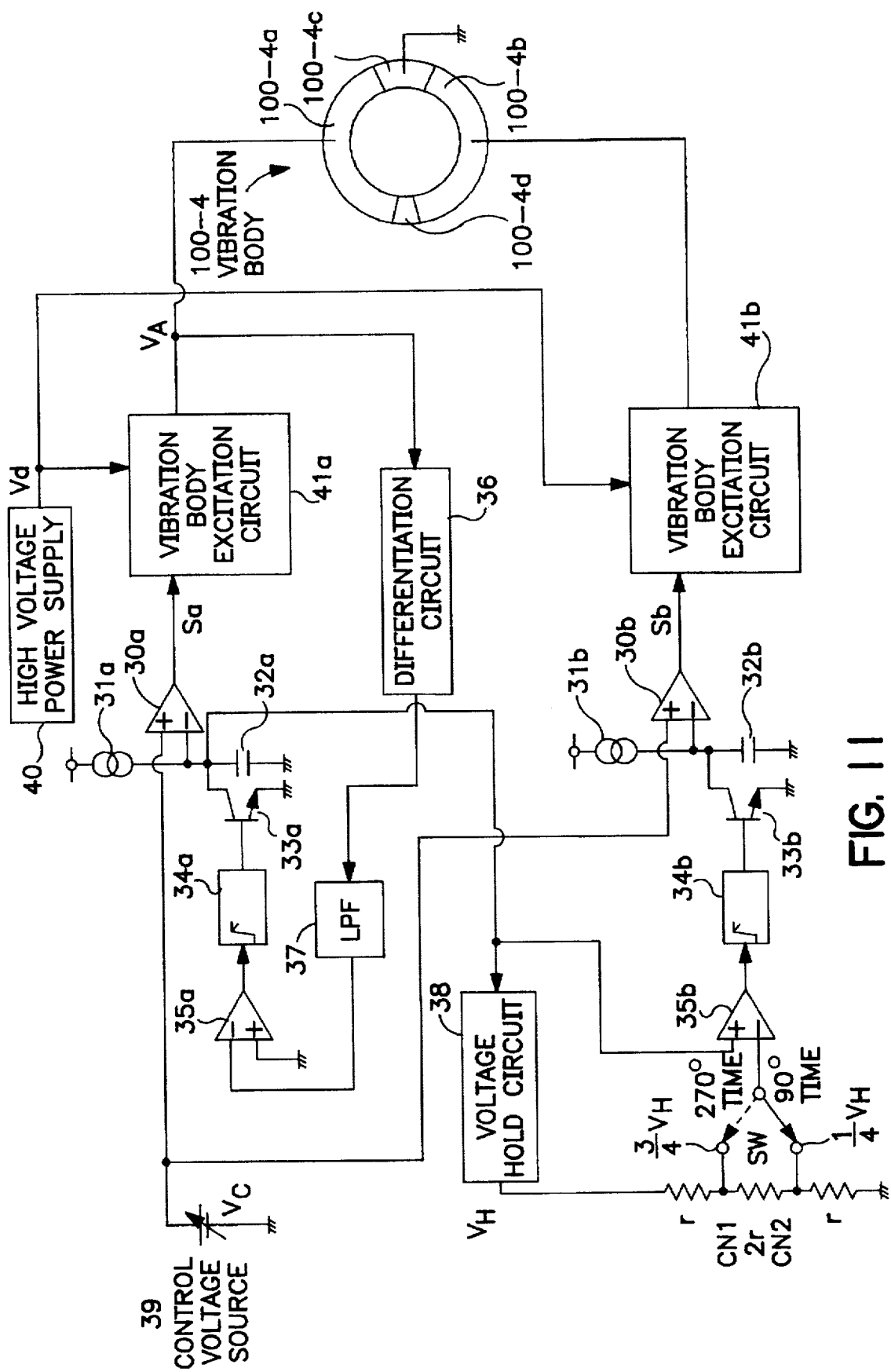
FIG. 11 is a circuit diagram of a drive device for a vibration actuator in accordance with embodiments of the present invention.

The embodiment of the invention shown in FIG. 11 differs from the embodiments shown in FIG. 1 and 7 in that the drive quantity (rotational speed) of the vibration motor is settled by adjusting the time of the interval $T_c$ by causing the voltage $V_c$ of a control voltage source 39 to change. Further, the embodiment shown in FIG. 11 differs in that a voltage controlled oscillator (VCO) is not used, and, instead, the drive device of FIG. 11 is driven by a self-excited circuit which itself decides the drive frequency, based on the vibration voltage waveform.

As shown in FIG. 11, a high voltage power supply 40 supplies a power supply voltage $V_d$. Further, excitation circuits 41a, 41b respectively confer an excitation voltage on the input electrodes 100-4a, 100-4b of the vibration body 100-4, and all are similar to the high voltage power supply and excitation circuits described with respect to the embodiments of the invention shown in FIGS. 1 and 7.

A differentiation circuit 36 is connected to the output of the excitation circuit 41a, and inputs the vibration voltage $V_A$ which is impressed on the input electrode 100-4a. Moreover, the output of the differentiation circuit 36 is connected to the negative input terminal of a voltage comparator 35a via LPF (low pass filter) 37. The voltage comparator 35a has its positive input terminal grounded, and the output of the voltage comparator 35a is input to a one-shot circuit 34a. The one-shot circuit 34a detects the rise of a pulse in an input signal, and outputs one (1) positive logic pulse of a very small predetermined period in response to detection of a rise in the input signal.

The output of the one-shot circuit 34a is connected to the base of a transistor 33a. The collector of transistor 33a is connected to the negative input terminal of a voltage comparator 30a and to a constant current source 31a. The emitter of transistor 33a is grounded. A capacitor 32a is connected between the collector of the transistor 33a and ground. The voltage comparator 30a has a control voltage source 39 connected to its positive input terminal, and its output is connected to an excitation circuit 41a.

Furthermore, the collector of the transistor 33a is connected to a voltage hold circuit 38 and to the positive input terminal of a voltage comparator 35b. The output of the voltage hold circuit 38 is connected to a series circuit of resistors r, 2r, r. Therefore, when the output voltage of the voltage hold circuit 38 is denoted as $V_H$, voltage values of respectively ¾·$V_H$ and ¼·$V_H$ appear at the junction points CN1 and CN2 of respective resistors.

A switch SW connects the respective junction points CN1 and CN2 of the resistors to the negative input terminal of the voltage comparator 35b. The junction point to which the switch SW connects the voltage comparator is 35b determined by the drive direction of the vibration actuator.

A circuit comprising a one-shot 34b, a transistor 33b, a capacitor 32b, a constant current source 31b and a voltage comparator 30b is connected between the voltage comparator 35b and an excitation circuit 41b. The structure and function of the circuit comprising one-shot 34b, transistor 33b, capacitor 32b, constant current source 31b and voltage comparator 30b are similar to those of the circuit between the voltage comparator 35a and the excitation circuit 41a, and a description of these elements is omitted here.

Figure 12:
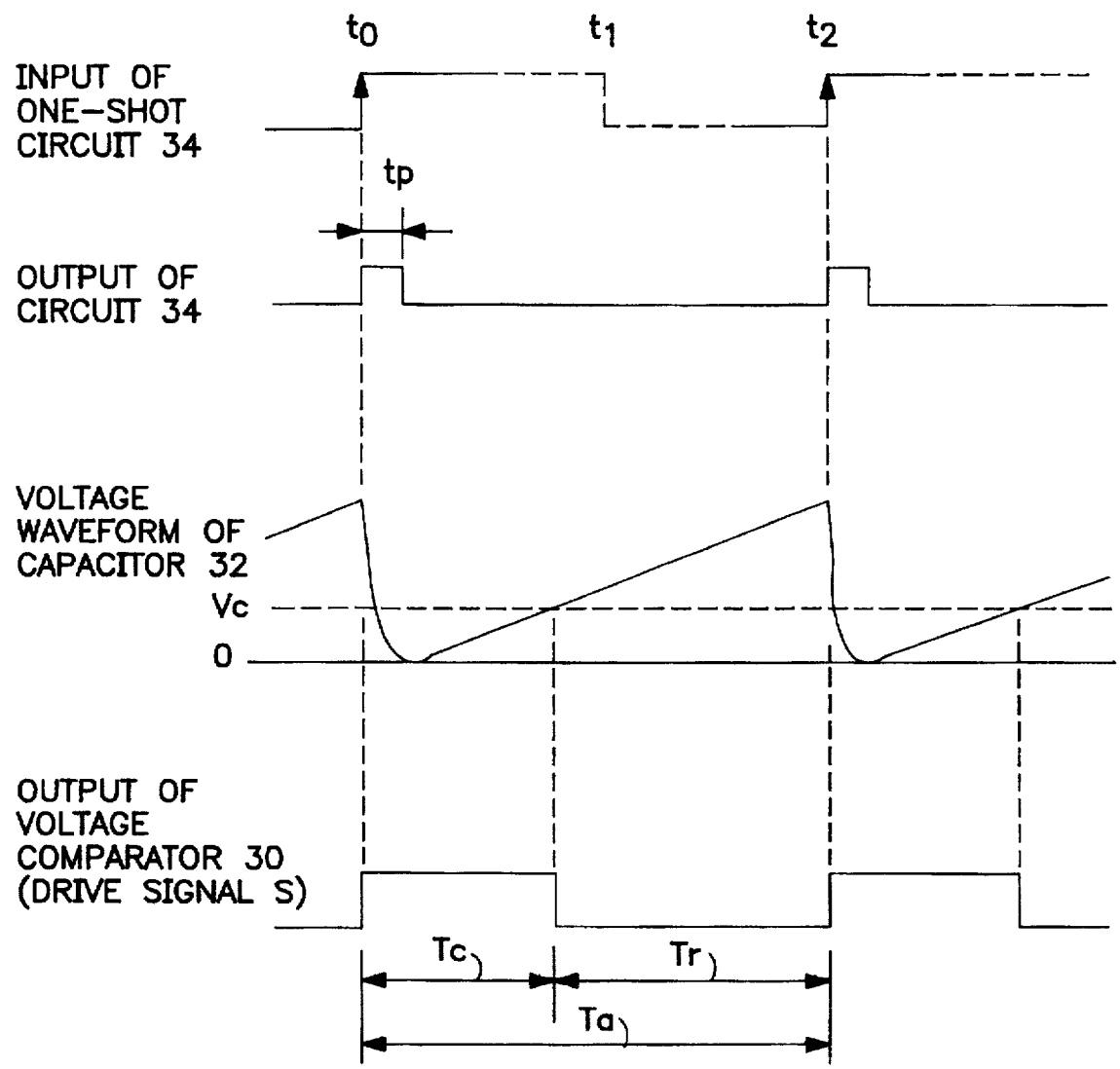
FIG. 12 is a graph showing the input and output signals of the one-shot circuit 34, shown in FIG. 11, in accordance with embodiments of the present invention.

The operation of the circuits which generate the drive signals Sa, Sb of the excitation circuits 41a, 41b in accordance with the embodiment of the invention shown in FIG. 11 will now be described. FIG. 12 illustrates graphs showing the form of the input and output signals in the one-shot 34, etc. Moreover, in the following description, because the input signals Sa, Sb differ only in their phase and the principle of formation is the same for each signal, the index (a,b) of the signal name will be omitted.

When the one-shot 34 detects the rise of a pulse in an input signal, the one shot outputs a positive pulse of pulse width $t_P$ to the base of the transistor 33. The transistor 33 is placed in an ON state only during the interval $t_P$ during which it receives the transmission of the positive pulse from the one-shot 34. When the transistor 33 is in the ON state, the capacitor 32 discharges the charge which had been stored, and its voltage becomes zero. It is noted that the interval $t_P$ may be the very small time which is necessary at least to sufficiently cause the capacitor 32 to discharge.

The transistor 33 is placed in an OFF state after the period $t_P$ has elapsed, and the capacitor 32 begins to charge from the constant current source 31. Accordingly, the voltage of the capacitor 32 becomes large in proportion to time, up until the time $t_2$ of the next input of the rise of a pulse to the one-shot 34.

The voltage comparator 30 compares the voltage waveform of the capacitor 32 with the control voltage $V_c$, and outputs a logic "H" signal during the interval in which the voltage of the capacitor 32 is small in comparison with $V_c$, and outputs a logic "L" signal other than this. FIG. 12 shows the waveform which the voltage comparator 30 outputs as a result of the comparison. The output signal from voltage comparator 30 becomes the drive signal S of the excitation circuit 41. Consequently, the repetition period $T_a$ of the drive signal S determines the period of the rise of the signal input to the one-shot 34. Moreover, the length of time of the interval $T_c$ changes due to the value of the control voltage $V_c$. Specifically, the larger the control voltage $V_c$, the longer the period $T_c$ becomes, and the smaller the control voltage $V_c$, the shorter the period $T_c$ becomes.

Figure 13:
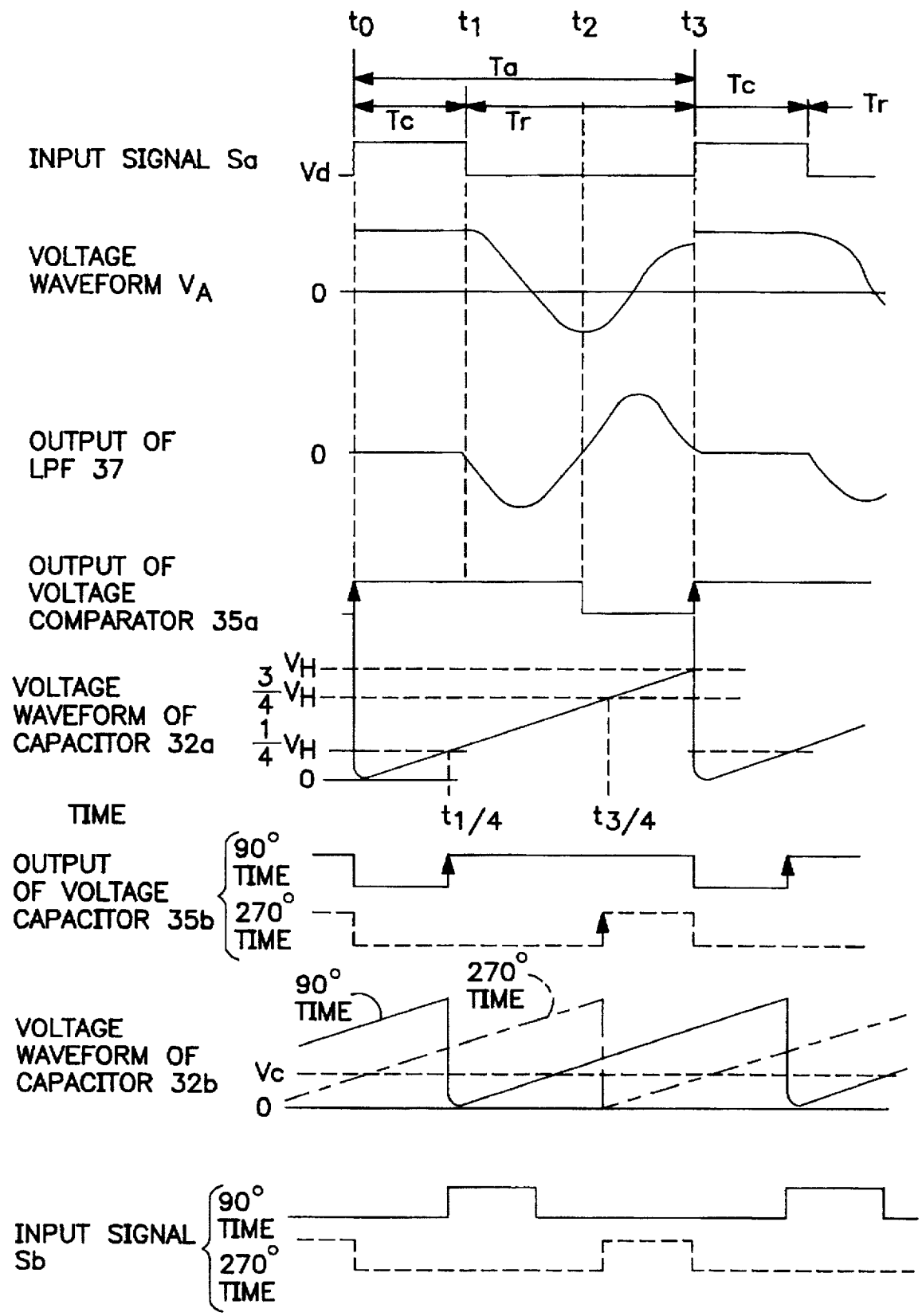
FIG. 13 is a graph showing the operation of components of the drive device, shown in FIG. 11, in accordance with embodiments of the present invention.
Figure 14A:
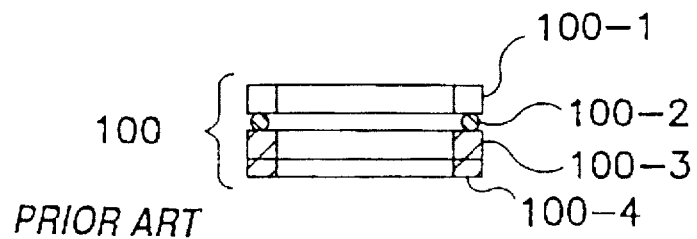
FIG. 14 is a diagram showing a conventional vibration motor.
Figure 14B:
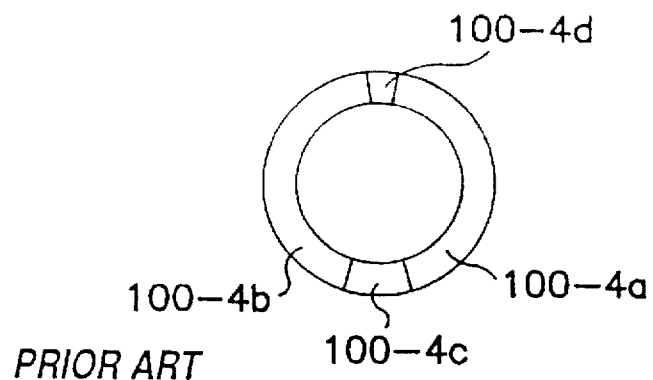
Figure 14C:
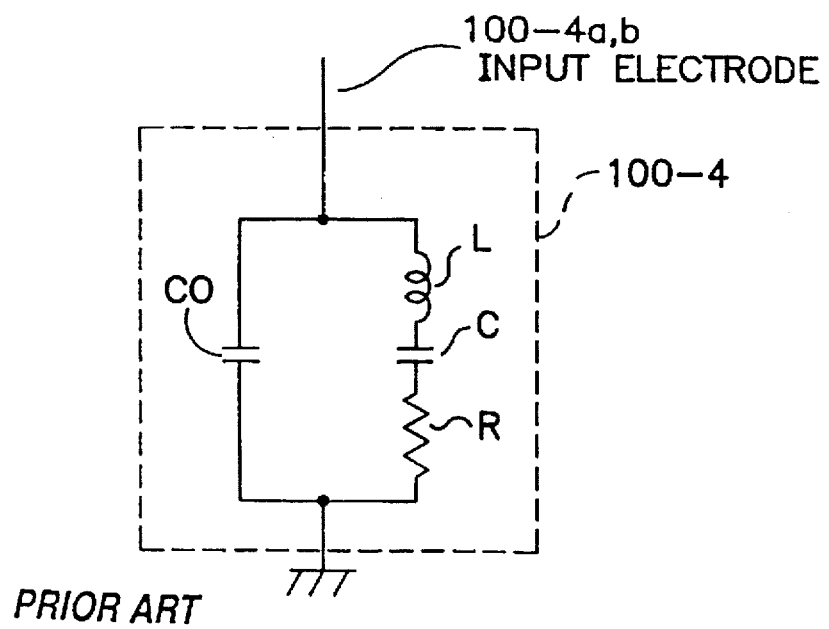
Figure 15:
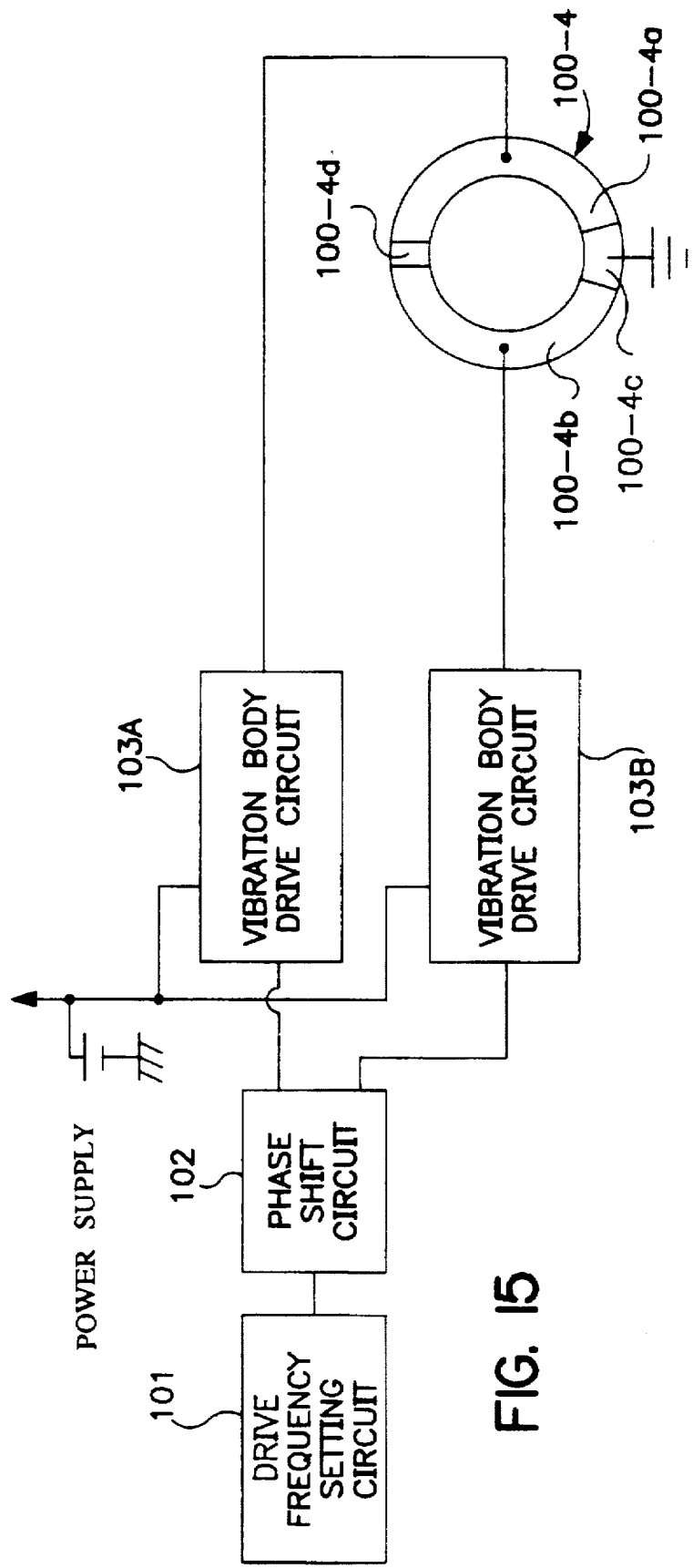
FIG. 15 is a block diagram of a drive device of a conventional vibration motor.

The principle of the generation of the rise in the input pulse of the one-shot 34 will now be described below. FIG. 13 illustrates graphs showing the input and output signals of the LPF 37, the voltage comparator 35 the voltage of capacitor 32, etc. Moreover, in the following description, for reasons similar to those mentioned above, the index (a,b) is omitted for each member or signal where it is not particularly necessary.

As shown in FIG. 13, the input drive signal S is at a logic level "H" from the instant $t_0$ to $t_1$, and a logic level "L" from instant $t_1$ to $t_3$. Specifically, from the instant $t_0$ to $t_3$ is one period of the drive signal S, specifically, one period of the drive of the vibration body 100-4. The voltage waveform of the voltage $V_A$ on the input electrode 100-4a of the vibration body 100-4 is shown in FIG. 13. The voltage waveform of voltage $V_A$ has already been described in connection with FIG. 3, and a description will be omitted here.

The waveform of the voltage $V_A$ is input to the differentiation circuit 36 and the LPF 37, and converted into a differential waveform, as shown in the graph of the output of LPF 37 in FIG. 13. The LPF 37 has the function of removing the high frequency component (the broken line portion in the FIG. 13) due to the sudden change in the voltage $V_d$ at the instant $t_3$.

The differential waveform output from LPF 37 shown in FIG. 13 is converted into a binary signal in the voltage comparator 35. Specifically, the signal obtained from voltage comparator 35 is at a logic level "H" when the differential waveform is negative from instant $t_0$ to $t_2$, and "L" when the differential waveform is positive from instant $t_2$ to $t_3$. However, in the case that the voltage at the negative input terminal of the voltage comparator 35 is equal to the ground potential, the voltage comparator 35 outputs a signal of logic level "H".

As shown in FIG. 13, the instant $t_1$ is the beginning instant of the vibration period of the voltage $V_A$, and the instant $t_3$ is the end instant of the vibration period. Specifically, from $t_1$ to $t_3$ is one period of vibration. The one-shot circuit 34 inputs the signal from the voltage comparator 35, and detects a rise of the signal at instants $t_0$ and $t_3$. Accordingly, the one-shot 34 outputs the pulse signal at instant $t_0$ and furthermore at instant $t_3$. As a result, as illustrated in FIG. 13, a new period of the drive signal S is generated at the instant $t_3$.

In accordance with the embodiment of the invention shown in FIGS. 11–13, alternating voltages are continuously impressed on the input electrodes 100-4a and 100-4b of the vibration body 100-4 by repeating such a sequence of operations.

Furthermore, it is necessary to impress drive signals which differ in phase by 90° or 270° on the respective input electrodes 100-4a and 100-4b of the vibration body 100-4. In accordance with the embodiment shown in FIGS. 11–13, in order to generate drive signals which differ in phase by 90° or 270° the final voltage of the capacitor 32a, which voltage becomes large in proportion to the time in the drive period $T_A$, is maintained using the voltage hold circuit 38 at the end of one period of the drive signal Sa. Denoting the voltage which is maintained by the hold circuit 38 as $V_H$, the value of $V_H$, representing the length of the period $T_a$, becomes larger, the longer the period $T_a$. Accordingly, a voltage which is ¼ of $V_H$ corresponds to the elapse of a time ¼·$T_a$ from the commencement of the drive signal Sa (period $T_a$), specifically, corresponds to a phase difference time of 90°. Similarly, ¾·$T_a$ corresponds to a phase difference time of 270°.

In accordance with the embodiment of the invention shown in FIGS. 11–13, by dividing the voltage $V_H$ with the resistors r, 2r, r, at the junction point of each resistor respective voltages of ¼·$V_H$ and ¾·$V_H$ are generated, and the voltage of either side is connected to the negative input terminal of the voltage comparator 35b via the switch SW. However, because the voltage of the capacitor 32a in the next period of the drive signal Sa is input to the positive input terminal of the voltage comparator 35b, the instants $t_{1/4}$, $t_{3/4}$ at which the output of the voltage comparator 35 changes from "L" to "H" come to have phase differences of 90°, 270° with respect to the respective drive signals Sa (FIG. 13 shows the voltage waveform of capacitor 32b where the full line denotes the signal with a phase difference of 90°, the broken line denotes a phase difference of 270°).

Moreover, in order to input the output of the voltage comparator 35 to the one-shot circuit 34, the output of voltage comparator 35 has a phase difference of 90° or 270° with respect to the input signal Sa or the input signal Sb (FIG. 13 shows the input signal Sb where the full line denotes the signal with a phase difference of 90°, and the broken line denotes a phase difference of 270°). Consequently, the excitation circuit 41b, with respect to the excitation circuit 41a, impresses an alternating voltage at a phase difference of 90° or 270° on the input electrode 100-4b of the vibration body 100-4.

In the manner described above, in accordance with the embodiment shown in FIGS. 11–13, the interval $T_r$ in the output signal of the drive signal S automatically agrees with the vibration period $T_K$ determined by the inductive element and the equivalent circuit of the vibration body 100-4. Thus, in accordance with the embodiment shown in FIGS. 11–13, the current supplied to the vibration body 100-4 from the high voltage power supply 40, in spite of the effects of temperature and the like, normally becomes a minimum, and makes possible efficient driving of a vibration motor.

Furthermore, in accordance with the embodiment shown in FIGS. 11–13, the drive quantity of the vibration actuator is settled by changing the repetition period $T_a$ of the drive signals Sa, Sb, causing increases and decreases of the length of the period $T_c$. It is possible to easily perform increase and decrease of the length of $T_c$ by causing the control voltage $V_c$ to change. Specifically, if $V_c$ is made large, $T_c$ becomes long, and as a result, the drive frequency falls, and the drive quantity (rotational speed) of the vibration motor becomes large. To the contrary, if the control voltage $V_c$ is made small, the period $T_a$ becomes short, the drive frequency increases, and the drive quantity (rotational speed) of the vibration motor becomes small.

Thus, in accordance with embodiment of the present invention, by driving the vibration body 110-4 at the resonant frequency of the vibration body 100-4, because of elastic motion of the vibration actuator, the elastic motion of best efficiency is performed in the center of the first resonant frequency band. Further, there exist a frequency region higher than the first resonant frequency band, the second resonant frequency band, and a frequency region lower than the first resonant frequency band, the third resonant frequency band. Consequently, in accordance with embodiments of the present invention, the drive frequency region can be limited, so as not to lock the drive frequency in the second and third resonant frequency bands.

It will be recognized that the present invention is not limited to the embodiments described hereinabove, and the embodiments described herein are exemplary. Anything which has essentially the same constitution as the technological concept stated in the claims of the invention, and confers similar utilization effects, is embraced within the scope of the present invention.

For example, the embodiments described herein relate to an annular form of vibration motor; however, the present invention is also suitable for a linear vibration motor.

Further, in accordance with embodiments of the present invention, the counter 15 was made to count the pulses between the instants $t_1$–$t_3$. But because it is considered as consisting of the relationship of $T_K=4(t_2-t_1)$, $N_K$ may be fourfold, such as to count pulses between the instants $t_1$–$t_2$, using four (4) circuits instead of two (2) circuits.

In accordance with embodiments of the invention, it is not necessary for the control circuit to output a sine waveform signal to cause vibrating motion in the electromechanical energy converting element, and it is possible to make the control circuit simple and compact. Further, because the drive frequency of the vibration actuator can be changed by the control circuit causing an increase and decrease of the interval for which the discharge circuit is connected to the electromechanical energy conversion element, it becomes possible to easily settle the drive quantity of the vibration actuator. Furthermore, because the control circuit has been made to control such that the interval for which the discharge circuit is connected to the electromechanical energy conversion element is equal to the period which was detected by the period detection circuit, normally efficient driving of the vibration motor is possible.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. A drive device for a vibration motor having an electromechanical energy converting element which converts electrical energy into mechanical energy, comprising:

a charging circuit to provide electrical energy to the electromechanical energy converting element by impressing a predetermined voltage on the electromechanical energy converting element;

a discharge circuit to generate mechanical energy in the electromechanical energy converting element, by causing the electromechanical energy converting element, which has been supplied with electrical energy, to discharge via an inductive element;

a control circuit to alternately connect the discharge circuit to the electromechanical energy converting element for a period which depends on the inductance characteristics of the inductive element, and to connect the charging circuit to the electromechanical energy converting element for a period which does not depend on the inductance characteristics of the inductive element; and a period detection circuit to detect a period of resonant vibration of the electromechanical energy converting element and the inductive element, wherein the control circuit controls the connection of the discharge circuit and the charging circuit so that the period for which the discharge circuit is connected to the electromechanical energy converting element is equal to the period detected by the period detection circuit, and changes the drive frequency of the vibration motor by increasing and decreasing the period for which the charging circuit is connected to the electromechanical energy converting element.

2. A drive device for a vibration motor as recited in claim 1, wherein the period detection circuit detects the period of resonant vibration by detecting a maximum value of the voltage change in the discharge circuit or the electromechanical energy converting element.

3. A drive device for a vibration motor having an electromechanical energy converting element which converts electrical energy into mechanical energy, comprising:

a charging circuit to provide electrical energy to the electromechanical energy converting element by impressing a predetermined voltage on the electromechanical energy converting element;

a discharge circuit to generate mechanical energy in the electromechanical energy converting element, by causing the electromechanical energy converting element, which has been supplied with electrical energy, to discharge via an inductive element; and a control circuit to alternately connect the discharge circuit to the electromechanical energy converting element for a period which depends on the inductance characteristics of the inductive element, and to connect the charging circuit to the electromechanical energy converting element for a period which does not depend on the inductance characteristics of the inductive element, wherein the control circuit is capable of detecting the voltage change of the electromechanical energy converting element, and after the discharge circuit is connected to the electromechanical energy converting element, when a maximum voltage value of the electromechanical energy converting element is detected, the charging circuit is connected to the electromechanical energy conversion element.

* * * * *